March 9, 1937.　　　　G. R. RICH　　　　2,073,178
COMPOSITE METAL MOTOR VALVE
Filed April 27, 1936
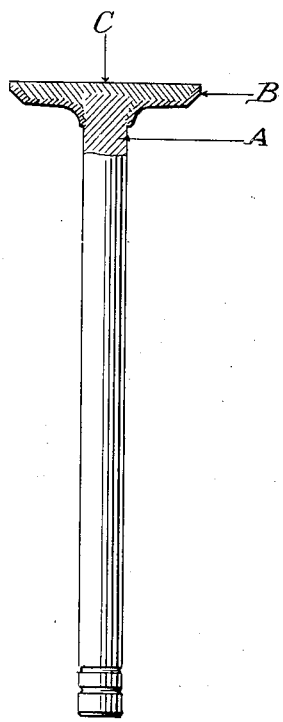
Inventor:
George R. Rich,
by Charles Q. Sherwry
his Atty.

Patented Mar. 9, 1937

2,073,178

UNITED STATES PATENT OFFICE 2,073,178

COMPOSITE METAL MOTOR VALVE

George R. Rich, Battle Creek, Mich.

Application April 27, 1936, Serial No. 76,659

5 Claims. (Cl. 123—188)

This invention relates to composite metal motor valves and has reference more particularly to valves composed of a stem and a head consisting of a cup-like seat portion and a cast metal top contained in the cup-like seat portion, all integrally united with each other into a single piece. A motor valve of this construction is more fully shown and described in my prior patent, Number 2,037,340, dated April 14, 1936, for improvements in Composite metal articles of manufacture, to which reference is hereinafter made.

The principal object of the present invention is to provide a stem of exceptional wearing qualities and capable of remaining rigid at high temperatures; a relatively soft cup-like seat portion capable of withstanding extremely high heats without scaling, and a cast metal top therein which is highly resistant to high temperatures and having a high thermo-conductivity, that is to say, it will conduct or expel the heat from the top of the valve head at a far greater rate than a solid one-piece valve head. Owing to these characteristics the valve head, in the operation of the valve, operates at a much lower temperature than a solid one-piece valve. This tends to reduce the maximum expansion in the diameter of the head and also the length of the stem, when hot, as compared with a one-piece valve.

Another and very important object of this invention is to form the three pieces, of which the present valve is constructed, of alloys having the different characteristics above set forth and which are capable of being effectively blended or fused together by the electric arc welding process to produce an integral piece without any danger of any of the stem becoming melted during the process of forming the valve.

With these and other objects and advantages in view, this invention consists in a valve formed of a stem, a stamped, cup-like seat portion, and a cast metal top therein, each formed of an alloy best suited for the particular purpose of that part in the valve and all integrally united into a single piece.

The invention further consists in the several novel features hereinafter fully set forth and claimed. The invention is clearly illustrated in the drawing accompanying this specification, in which the figure is a view partly in side elevation and partly in central, vertical section of a motor valve embodying one form of the invention.

Referring to said drawing, the character A designates the stem of the valve, B designates a cup-like stamping which provides the beveled seat or seating face of the head of the valve and C designates the top or body portion of the head. As in my prior patent above referred to, one end of the stem projects into the cup-like stamping and the top is fused to said end of the valve stem and to the cup-like stamping B, whereby the three pieces are integrally united. As in the valve of my prior patent, the top is cast upon the cup-like part and end of the stem from a bar of cast metal by the arc welding process at a temperature which blends the molten metal of the top with the metal of the stamped cup and stem.

The three pieces A, B and C are composed of three different alloys, each of which is best suited for the particular part of the valve it forms. As an example of the alloys used in the three parts of the valve, the following ingredients and proportions have been found to give the most efficient results.

For the stem:

|  | Percent |
| --- | --- |
| Carbon | .20– .50 |
| Chromium | 2.0 –4.00 |
| Silicon | 3.0 –5.0 |
| Manganese | .30– .70 |
| Sulphur | Under .03 |
| Phosphorus | Under .03 |
| Remainder | Iron |

For the cup-like stamping or seat portion of the head:

|  | Percent |
| --- | --- |
| Carbon | .10– .30 |
| Chromium | 18.0 –25.0 |
| Nickel | 10.0 –20.0 |
| Silicon | .75– 1.75 |
| Remainder | Iron |

For the top of the head:

|  | Percent |
| --- | --- |
| Carbon | 2.25–3.75 |
| Chromium | 5.0 –8.5 |
| Silicon | 3.0 –6.0 |
| Manganese | .30– .90 |
| Sulphur | Under .03 |
| Phosphorus | Under .03 |
| Remainder | Iron |

While the range above specified is the preferred one, the lower limit has been found very desirable. However, for the stem less silicon may be used than specified, and I have found that as low as 1 per cent of silicon can be used. In the cup alloy, 6 per cent of nickel has been used with good effects in the composition. In the alloy for the top of the head the carbon content may be reduced as low as 1 per cent in some cases and less chromium may be used, for instance, 3 per cent chromium has proven satisfactory in the composition. I have also found that the addition of about 3 per cent of nickel in the composition for the top of the head has its advantages.

It is to be observed that the chromium content of the cup-like seat portion of the head is greater than the chromium content of the stem and top of the head combined, and that the chromium content of the top is greater than that of the stem.

With the use of the three separate alloys for the three pieces that go to make up the valve, a stem is obtained which has exceptionally good wearing properties and retains its rigidity at high temperatures. The cup-like stamping or seat portion for the head is relatively soft and is capable of withstanding high heats without scaling and the cast iron top serves to blend the pieces together into one integral whole and is highly resistant to the high temperatures developed in motors, does not scale and at the same time provides a very hard rigid top for the head.

In my experiments developing alloyed materials for the several parts of a three piece motor valve, I have made some very important discoveries with respect to the thermo-conductivity of the valve itself and from these discoveries I have been enabled to determine the respective ingredients and proportions thereof for the alloyed materials of the three parts of the valve, which produce a valve having a stem from which the heat is removed as fast as it penetrates the stem. I have found that the stem, although composed of material of relatively inferior quality, stands up as well as those composed of the higher chrome silicon steels used in the more expensive valves.

I believe that this is due to the relatively low heat conductivity of the material of the stem as compared with the high heat conductivity of the head. As compared with the heat conductivity of silver at 100 and copper at 98, the heat conductivity of the material in the stem is about 3. The result is that the stem material is almost nil in heat conductivity, whereas the materials of the cup-like stamping and the top of the valve head have a heat conductivity between 16 and 18, and in some cases as high as 20.

This combination of a valve head having a heat conductivity of 16 plus, and a stem of only 3, the heat penetrates the stem very slowly, and due to the size and rapid heat conductivity of the head, the latter siphons, as it were, the heat from the stem and conducts it to the seat of the motor and out from the top of the valve into the cylinder area, which is considerably cooler than the underside of the valve head (having reference to the exhaust valve).

The excessive heat is not in the cylinders, but is due to a fast, torch-like flame from the edge of the seat, covering a space of about one-half inch under the valve head. This temperature will, at times, reach as high as 1700° Fahrenheit, consequently the stem material, being of a very slow conductor of heat, and the head having five to six times the conductivity of heat as the stem, the head siphons, as it were, the heat that does penetrate into the neck portion of the stem faster than it can penetrate, shedding heat through the seat and out through the top material of the valve head into the cylinder area.

It is important to the efficient operation of a motor to keep the heat out of the stem guide, and owing to the low heat conductivity of the stem and rapid heat conductivity through the head, which is of greater area, the tendency is to siphon, as it were, the heat from the stem, the result being far less heat penetrates into the stem guide, but flows out through the head of the valve.

I claim as new and desire to secure by Letters Patent:

1. A composite metal motor valve, comprising a stem and a head integrally united therewith, the latter being composed of alloyed material having a relatively high heat conductivity as compared with the heat conductivity of the stem.

2. A composite metal motor valve, comprising a steel stem having a relatively low heat conductivity, and a head integrally united with the stem and having a relatively high heat conductivity.

3. A composite metal motor valve, comprising a steel stem having a relatively low heat conductivity, and a head formed of a stamped metal cup-like part and a cast metal top integrally uniting the stem with the cup-like part, the top and cup-like part having a relatively high heat conductivity as compared with that of the stem.

4. A composite metal motor valve, comprising a stem and a separately formed head integrally united therewith, the stem having a relatively low heat conductivity and the head having a heat conductivity of at least five times as high as that of the stem.

5. A composite metal valve, comprising a stem and a separately formed head, integrally united therewith and composed of alloyed material whose heat conductivity is many times greater than that of the stem.

GEORGE R. RICH.